United States Patent
Balasubramanian et al.

(10) Patent No.: US 12,386,010 B2
(45) Date of Patent: Aug. 12, 2025

(54) JOINT NETWORK ENTITY/USER EQUIPMENT-AND-USER EQUIPMENT/USER EQUIPMENT RANGING

(71) Applicant: QUALCOMM Incorporated, San Diego, CA (US)

(72) Inventors: Anantharaman Balasubramanian, San Diego, CA (US); Kapil Gulati, Belle Mead, NJ (US); Shuanshuan Wu, San Diego, CA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 327 days.

(21) Appl. No.: 17/891,829

(22) Filed: Aug. 19, 2022

(65) Prior Publication Data
US 2024/0061063 A1    Feb. 22, 2024

(51) Int. Cl.
*G01S 5/00* (2006.01)
*H04W 64/00* (2009.01)

(52) U.S. Cl.
CPC ......... *G01S 5/0072* (2013.01); *H04W 64/003* (2013.01)

(58) Field of Classification Search
CPC ...... G01S 5/0072; G01S 1/042; G01S 5/0205; G01S 5/0009; G01S 5/0063; H04W 64/003; H04W 64/00; H04W 8/24
See application file for complete search history.

(56) References Cited

U.S. PATENT DOCUMENTS

2019/0297673 A1* 9/2019 Xue .................. H04W 4/70
2020/0280951 A1* 9/2020 Tsuda ................ H04W 64/00
(Continued)

FOREIGN PATENT DOCUMENTS

WO    2022022341 A1    2/2022

OTHER PUBLICATIONS

Ericsson: "SL positioning", 3GPP TSG-RAN WG2 Meeting #119-e, R2-2208080, 3rd Generation Partnership Project, Mobile Competence Centre, 650, Route Des Lucioles, F-06921 Sophia-Antipolis Cedex, France, vol. RAN WG2, No. e-Meeting, Aug. 17, 2022-Aug. 29, 2022, Aug. 10, 2022, 8 Pages, figure 4, sections: 1 Introduction, 2 Sidelink ranging/positioning architecture and signalling procedures.

(Continued)

*Primary Examiner* — Kenneth T Lam
(74) *Attorney, Agent, or Firm* — Thien T. Nguyen

(57) ABSTRACT

A method of assisting joint network entity/user equipment and user equipment/user equipment (NE/UE-and-UE/UE) ranging includes: transmitting, from a first UE to a network entity, a capability indication that indicates a capability of the first UE to serve as an anchor UE for joint NE/UE-and-UE/UE ranging; obtaining, at the first UE, a location of the first UE; transmitting, from the first UE, the location of the first UE; transmitting, from the first UE to the network entity, at least one indication that a second UE is in a line of sight of the first UE or that the second UE is in close proximity to the first UE; and transmitting, from the first UE, at least one of a first positioning reference signal to the second UE, or a measurement report indicating a measurement of a second positioning reference signal received by the first UE from the second UE.

25 Claims, 9 Drawing Sheets

(56) References Cited

U.S. PATENT DOCUMENTS

| | | |
|---|---|---|
| 2021/0160712 A1 | 5/2021 | Tadayon et al. |
| 2021/0250231 A1* | 8/2021 | Vassilovski ........... H04W 76/14 |
| 2021/0377906 A1* | 12/2021 | Bao ....................... H04W 24/10 |
| 2022/0086822 A1* | 3/2022 | Bao ......................... G01S 1/024 |
| 2022/0244344 A1* | 8/2022 | Bao ....................... H04W 64/00 |
| 2022/0353843 A1* | 11/2022 | Bao .................... H04W 64/003 |
| 2022/0365163 A1* | 11/2022 | Baek ....................... H04W 4/40 |
| 2023/0319768 A1* | 10/2023 | Zhou .................... H04W 76/50 |
| | | 455/456.6 |
| 2024/0215054 A1* | 6/2024 | Haustein ................. H04W 4/20 |

OTHER PUBLICATIONS

International Search Report and Written Opinion—PCT/US2023/027026—ISA/EPO—Nov. 10, 2023.

* cited by examiner

JOINT NETWORK ENTITY/USER EQUIPMENT-AND-USER EQUIPMENT/USER EQUIPMENT RANGING

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Ultra-wideband (UWB) technology may be used to transmit signals with wide bandwidth (e.g., >500 MHz). Signal energy may be transmitted without interfering with narrowband and carrier wave transmission in the same frequency band. UWB may be used for low-energy, short-range applications, e.g., for ranging. UWB is presently divided into channels 1-15 spanning frequencies from about 3.5 GHz to about 4.5 GHz and from about 6.5 GHz to about 10 GHz.

SUMMARY

An example first user equipment (UE) includes: a transceiver; a memory; one or more processors communicatively coupled to the transceiver and the memory and configured to: transmit, to a network entity (NE) via the transceiver, a capability indication that indicates a capability of the first UE to serve as an anchor UE for joint NE/UE-and-UE/UE ranging; obtain a location of the first UE; transmit, via the transceiver, the location of the first UE; and transmit, via the transceiver to the network entity, at least one indication that a second UE is in a line of sight of the first UE or that the second UE is in close proximity to the first UE; and transmit, via the transceiver, at least one of a first positioning reference signal to the second UE, or a measurement report indicating a measurement of a second positioning reference signal received by the first UE from the second UE.

An example method of assisting joint NE/UE-and-UE/UE ranging includes: transmitting, from a first UE to a network entity, a capability indication that indicates a capability of the first UE to serve as an anchor UE for joint NE/UE-and-UE/UE ranging; obtaining, at the first UE, a location of the first UE; transmitting, from the first UE, the location of the first UE; transmitting, from the first UE to the network entity, at least one indication that a second UE is in a line of sight of the first UE or that the second UE is in close proximity to the first UE; and transmitting, from the first UE, at least one of a first positioning reference signal to the second UE, or a measurement report indicating a measurement of a second positioning reference signal received by the first UE from the second UE.

Another example first UE includes: means for transmitting, to a network entity, a capability indication that indicates a capability of the first UE to serve as an anchor UE for joint NE/UE-and-UE/UE ranging; means for obtaining a location of the first UE; means for transmitting the location of the first UE; means for transmitting at least one indication that a second UE is in a line of sight of the first UE or that the second UE is in close proximity to the first UE; and means for transmitting at least one of a first positioning reference signal to the second UE, or a measurement report indicating a measurement of a second positioning reference signal received by the first UE from the second UE.

An example non-transitory, processor-readable storage medium includes processor-readable instructions to cause one or more processors of a first UE to: transmit, to a network entity, a capability indication that indicates a capability of the first UE to serve as an anchor UE for joint NE/UE-and-UE/UE ranging; obtain a location of the first UE; transmit the location of the first UE; transmit at least one indication that a second UE is in a line of sight of the first UE or that the second UE is in close proximity to the first UE; and transmit at least one of a first positioning reference signal to the second UE, or a measurement report indicating a measurement of a second positioning reference signal received by the first UE from the second UE.

DETAILED DESCRIPTION

Figure 1:
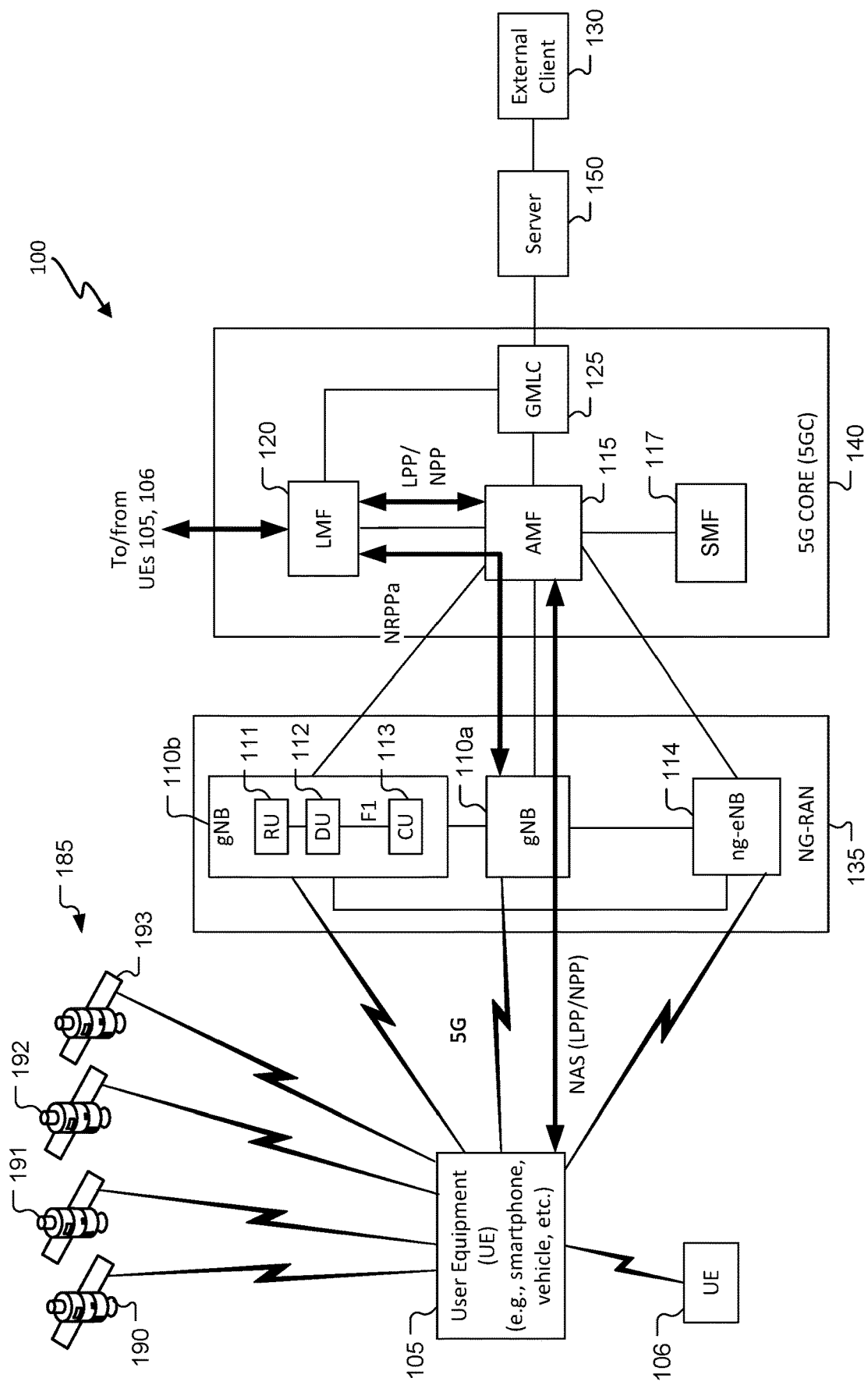
FIG. 1 is a simplified diagram of an example wireless communications system.

Techniques are discussed herein for joint network entity (NE)/user equipment (UE) and UE/UE ranging, including joint NE/UE and UE/UE positioning. One or more positioning signals may be transferred between a network entity and a target UE, and one or more positioning signals transferred between the target UE and an anchor UE, and measurements of the positioning signals between the NE and the target UE, and between the target UE and the anchor UE may be used to determine position information, e.g., ranges between the NE and the target UE and between the anchor UE and the target UE, and/or a location estimate for the target UE. Other implementations than these examples, however, may be used.

Items and/or techniques described herein may provide one or more of the following capabilities, as well as other capabilities not mentioned. Positioning accuracy may be improved for positioning of a target UE. Positioning of a target UE that is non-line-of-sight (NLOS) relative to a network entity may be enabled or positioning accuracy for an NLOS target UE may be improved. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3$^{rd}$ Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more base stations, e.g., one or more of the gNBs 110a, 110b and/or the ng-eNB 114 may be configured to communicate with the UE 105 via multiple carriers. Each of the gNBs 110a, 110b and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH). Direct wireless-device-to-wireless-device communications without going through a network may be referred to generally as sidelink communications without limiting the communications to a particular protocol.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110a includes an RU 111, a DU 112, and a CU 113. The RU 111, DU 112, and CU 113 divide functionality of the gNB 110a. While the gNB 110a is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110a. The DU 112 hosts the Radio Link Control (RLC), Medium Access Control (MAC), and physical layers of the gNB 110a. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110a. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110a, 110b (e.g., via the RU 111, the DU 112, and the CU 113) and/or the ng-eNB 114, and/or the LMF 120. As another example, the UE 105, one or more of the gNBs 110a, 110b (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS (Synchronization Signals) or PRS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110a, 110b, the ng-eNB 114, etc.) to compute the UE's position.

Figure 2:
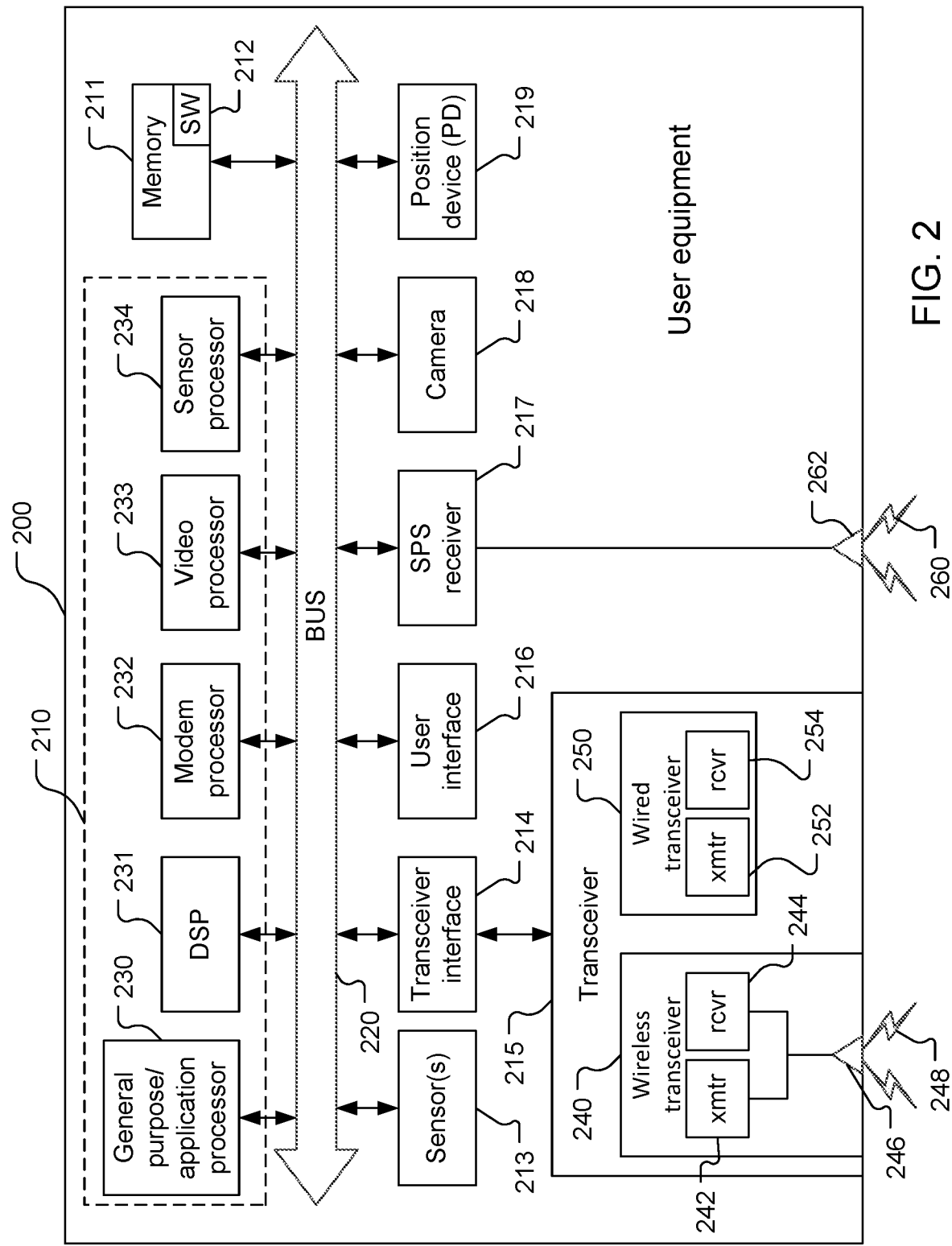
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both.

The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
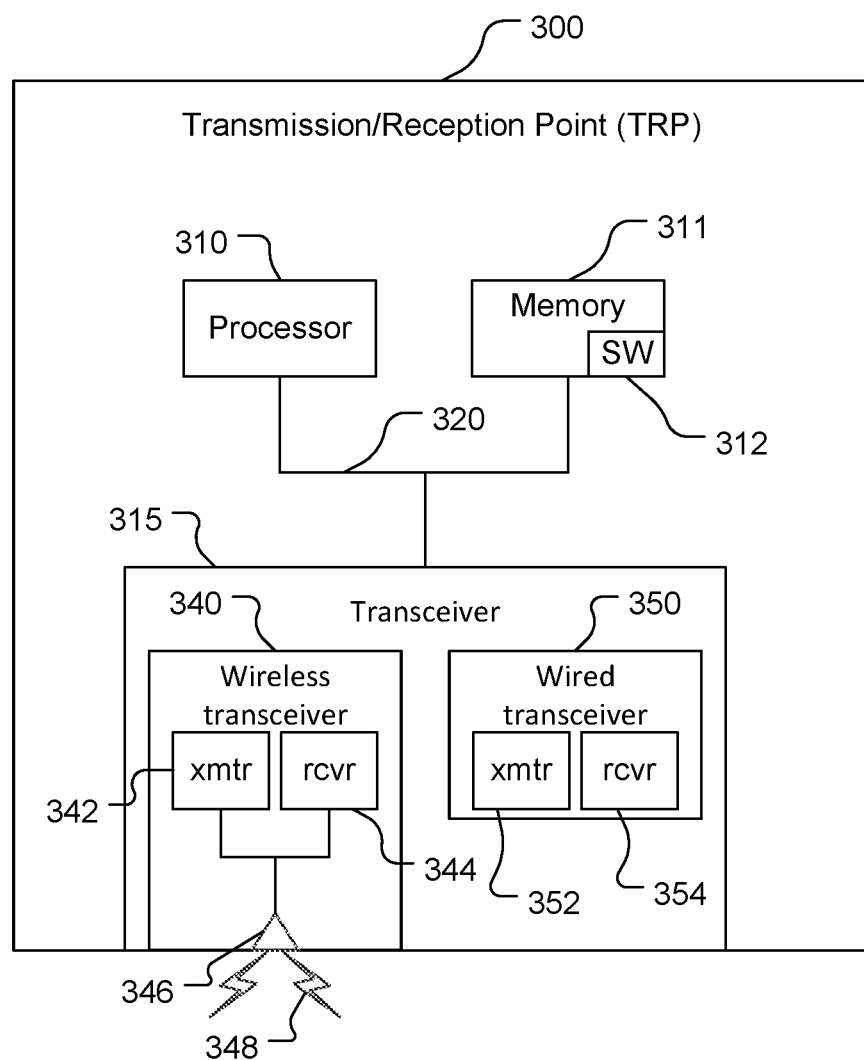
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
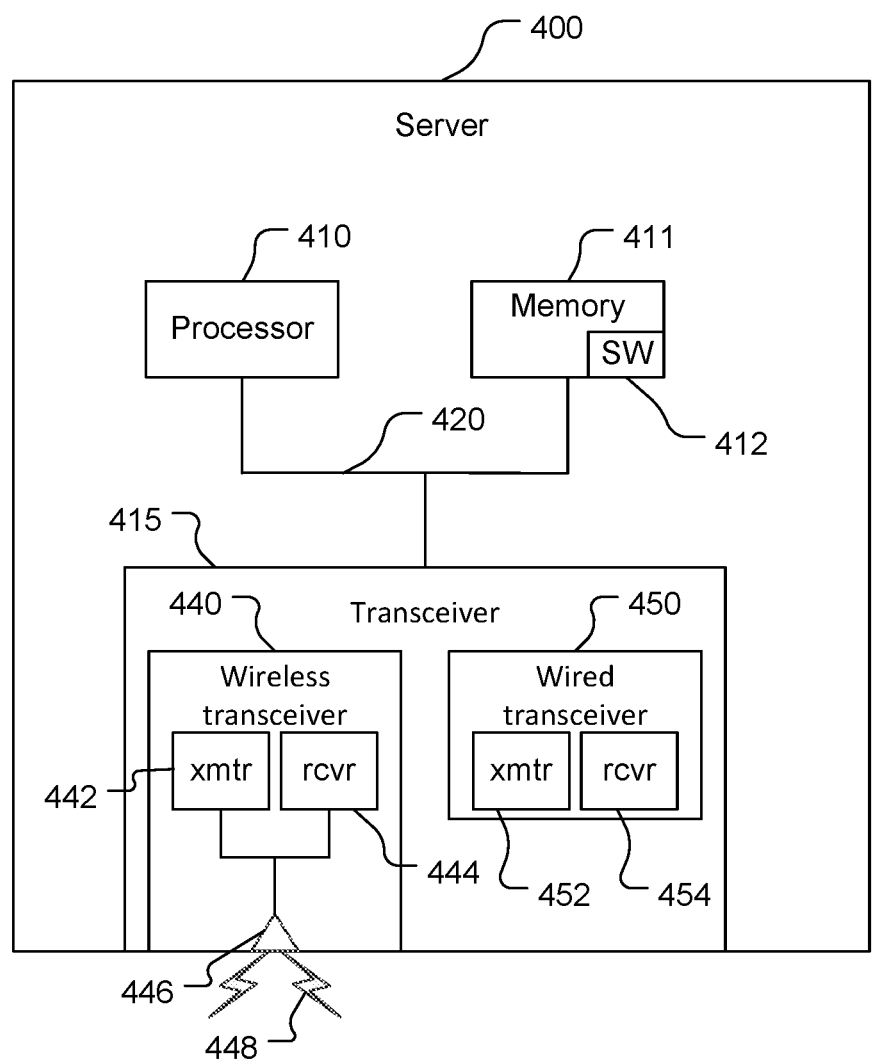
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \rightarrow Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx\text{-}Rx}$ between the transmission time of the RTT measurement signal from the base station and the ToA of the RTT response at the base station to the UE-reported time difference $T_{Rx \rightarrow Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS ((Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every NL resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource (or simply resource) can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning being sent by UEs, and with PRS and SRS for positioning being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Joint NE/UE and UE/UE Positioning

Figure 5:
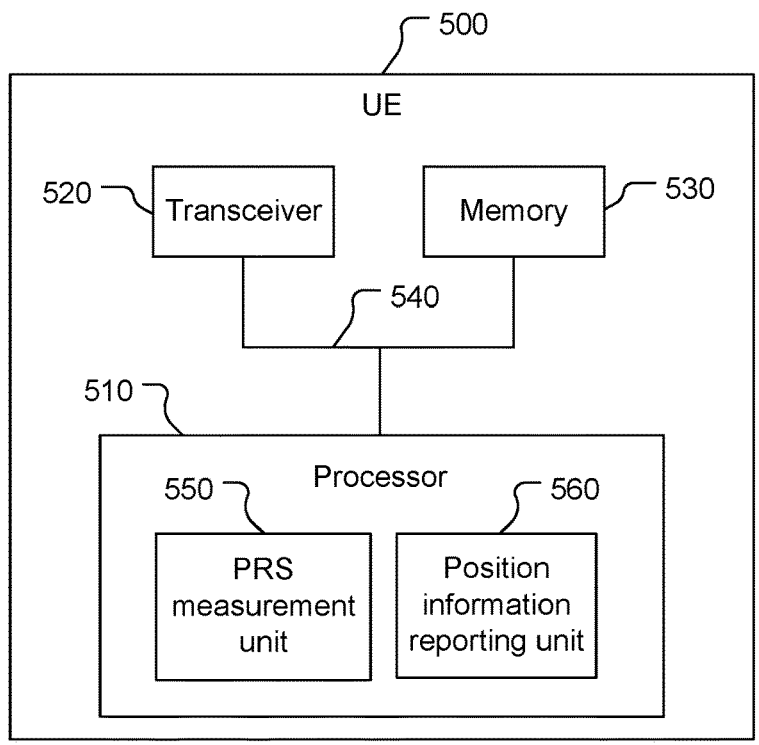
FIG. 5 is a block diagram of an example user equipment.

Referring to FIG. 5, a UE 500 includes a processor 510, a transceiver 520, and a memory 530 communicatively coupled to each other by a bus 540. The UE 500 may include the components shown in FIG. 5, and may include one or more other components such as any of those shown in FIG. 2 such that the UE 200 may be an example of the UE 500. For example, the processor 510 may include one or more of the components of the processor 210. The transceiver 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 520 may include the wired transmitter 252 and/or the wired receiver 254. The memory 530 may be configured similarly to the memory 211, e.g., including software with processor-readable instructions configured to cause the processor 510 to perform functions.

The description herein may refer only to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the transceiver 520) may include a PRS measurement unit 550 and a position information reporting unit 560. The PRS measurement unit 550 and the position information reporting unit 560 are discussed further below, and the description may refer to the processor 510 generally, or the UE 500 generally, as performing any of the functions of the PRS measurement unit 550 and the position information reporting unit 560, with the UE 500 being configured to perform the functions.

Figure 6:
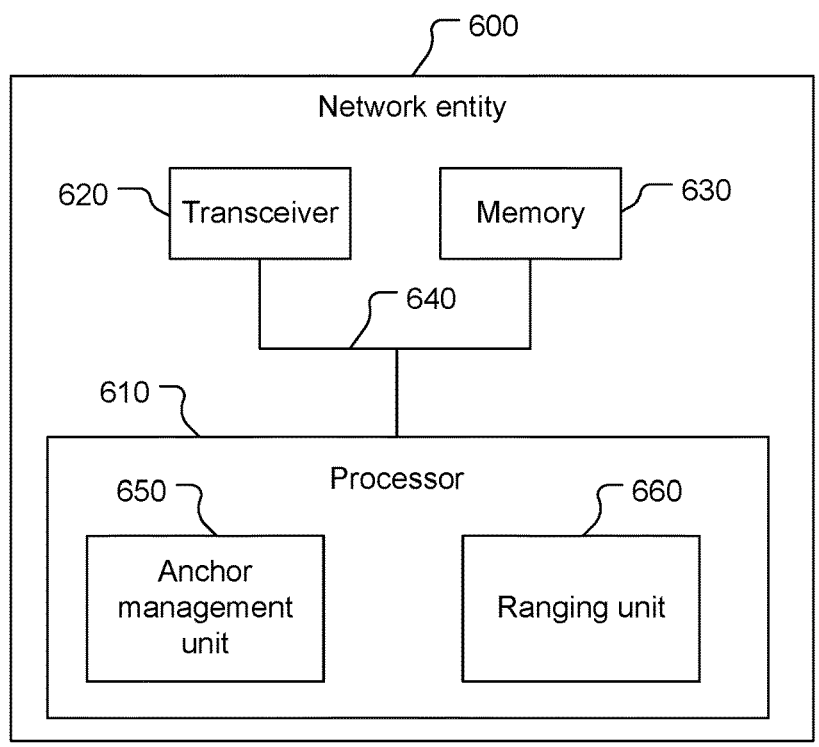
FIG. 6 is a block diagram of an example network entity.

Referring to FIG. 6, a network entity 600 includes a processor 610, a transceiver 620, and a memory 630 communicatively coupled to each other by a bus 640. The network entity 600 may include the components shown in FIG. 6, and may include one or more other components such as any of those shown in FIG. 3 and/or FIG. 4 such that the network entity 600 may be part of the server 400 (e.g., a location server such as an LMF), and/or integrated in the TRP 300. Thus, reference to the processor 610, the transceiver 620, or the memory 630 is equivalent to reference to the corresponding component(s) of the server 400 or the TRP 300. For example, the transceiver 620 may include one or more of the components of the transceiver 315 and/or the transceiver 415, e.g., the antenna 346 and the wireless transmitter 342 and/or the wireless receiver 344, and/or the antenna 446 and the wireless transmitter 442 and/or the wireless receiver 444. Also or alternatively, the transceiver 620 may include the wired transmitter 352 and/or the wired receiver 354, and/or the wired transmitter 452 and/or the wired receiver 454. The memory 630 may be configured similarly to the memory 311 and/or the memory 411, e.g., including software with processor-readable instructions configured to cause the processor 610 to perform functions. The network entity 600 may be a standalone device, or may be part of or integrated with a server (e.g., and LMF) or a TRP.

The description herein may refer only to the processor 610 performing a function, but this includes other implementations such as where the processor 610 executes software (stored in the memory 630) and/or firmware. The description herein may refer to the network entity 600 performing a function as shorthand for one or more appropriate components (e.g., the processor 610 and the memory 630) of the network entity 600 performing the function. The processor 610 (possibly in conjunction with the memory 630 and, as appropriate, the transceiver 620) may include an anchor management unit 650 and a ranging unit 660. The anchor management unit 650 and the ranging unit 660 are discussed further below, and the description may refer to the processor 610 generally, or the network entity 600 generally, as performing any of the functions of the anchor management unit 650 and/or the ranging unit 660, with the network entity 600 being configured to perform the functions.

Ranging using a Uu interface between a network entity (NE) and a UE has been discussed in various 3GPP (Third Generation Partnership Protocol) standards releases, and sidelink ranging and positioning will be addressed in one or more standards releases in the near future. Sidelink ranging protocol may use entities such as roadside units (RSUs) and/or anchor UEs (UEs with known locations, e.g., locations known within a threshold accuracy) such as vehicle UEs (VUEs) to range with one or more target UEs (e.g., target VUEs) in a distributed manner. Sidelink positioning (e.g., to determine a location estimate of a target UE) inherently includes sidelink ranging to determine one or more ranges between a target UE and one or more other entities (e.g., NEs, anchor UEs, etc.). While Uu ranging (e.g., positioning) and sidelink ranging (e.g., positioning) have been addressed in isolation, the discussion herein addresses joint NE/UE and UE/UE ranging (e.g., positioning) for a target UE. A target UE can range with one or more NEs and with one or more anchor UEs and ranging measurements of positioning signals transferred between the target UE and the anchor UE(s) and the between the target UE and the NE(s) can be used in combination to determine ranging between the target UE and the anchor UE(s) and the NE(s), which may be used for positioning of the target UE (e.g., determining an estimated location of the target UE relative to a global coordinate system).

Figure 7:
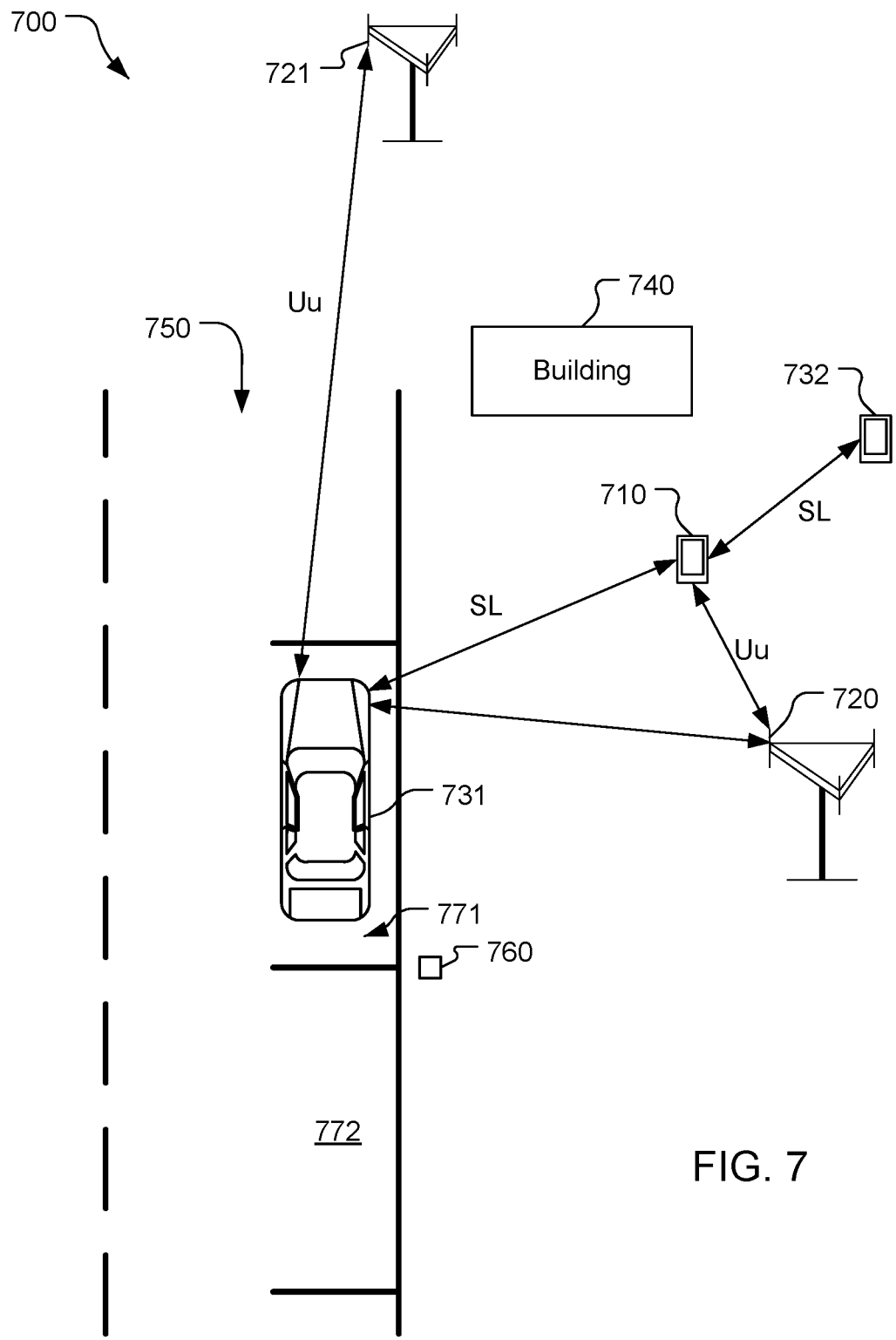
FIG. 7 is a diagram of an example wireless communication environment.

Referring to FIG. 7, with further reference to FIGS. 1-6, a wireless communication environment 700 includes a target UE 710, network entities 720, 721, and anchors 731, 732. The target UE 710 (a UE whose location is desired) is an example of the UE 500 and may engage in PRS transfer (transmission and/or reception of UL PRS, DL PRS, SL PRS) between the target UE 710 and the network entities 720, 721 through respective Uu interfaces and between the target UE 710 and the anchors 731, 732 (e.g., anchor UEs) through respective (mobile-to-mobile (e.g., PC5)) interfaces, labeled SL (sidelink) in FIG. 7. The network entities 720, 721 are both examples of the network entity 600, here shown as TRPs of respective base stations, although the network entities 720, 721 may be configured differently than shown (e.g., including a server in addition to a TRP) and/or differently from each other. Here, the target UE 710 is a smartphone, the anchor 731 is a vehicle UE (VUE), and the anchor 732 is a smartphone. These are examples and one or more other forms of target UE may be used and/or one or more other forms of anchors in addition to and/or instead of either or both of the anchors 731, 732 may be used. The multiple network entities 720, 721 may be deployed in the environment 700 to help improve the probability of one or more network entities being LOS with the target UE 710. One or more anchors such as the anchors 731, 732 may be selected and/or used based on the location of each of the selected/used anchors being known, or known with at least a threshold accuracy (e.g., within less than a distance threshold). With the anchors 731, 732 being mobile devices, the anchors 731, 732 may have a greater chance of being in close proximity to and/or in LOS with the target UE 710, which may result in better signal quality reception, more accurate corresponding range determinations, and more accurate location estimate determination for the target UE 710. The anchors 731, 732, being LOS with the target UE 710 as shown, would be more suitable for performing ranging for the target UE 710 than the network entity 721, which is NLOS with respect to the target UE 710 as shown due to the presence of a building 740 between the network entity 721 and the target UE 710.

The discussion herein provides techniques (e.g., methods and/or signaling schemes) for ranging for the target UE 710. For example, methods and/or signaling schemes are discussed for determining which UEs the network entity 720 (e.g., of a gNB) may or even should choose to serve as anchors to perform ranging with the target UE 710. The network entity 720 may have a preference for choosing VUEs (over non-vehicle UEs) as anchors as the VUEs may have more accurate location estimates than non-vehicle UEs. As another example, techniques are discussed for ranging operations such as coordinating network entity involvement with one or more anchors for target UE ranging. As another example, methods and/or signaling schemes are discussed for configuring PRS sequences and sessions between the network entity 720 and the anchor(s). As another example, signaling between the anchor(s) and the network entity 720 is discussed to make the network entity 720 aware of the channel/environmental conditions present between the anchor(s) and the target UE 710. As another example, signaling between the network entity 720 and the anchor(s) is discussed for enabling the anchor(s) to provide ranging outcomes (e.g., range between a respective anchor and the target UE 710). Joint Uu and SL ranging may provide flexibility to the network entity 720 to choose the anchor(s) (e.g., that are LOS with the target UE 710) for ranging (e.g., positioning) with the target UE 710.

Figure 8:
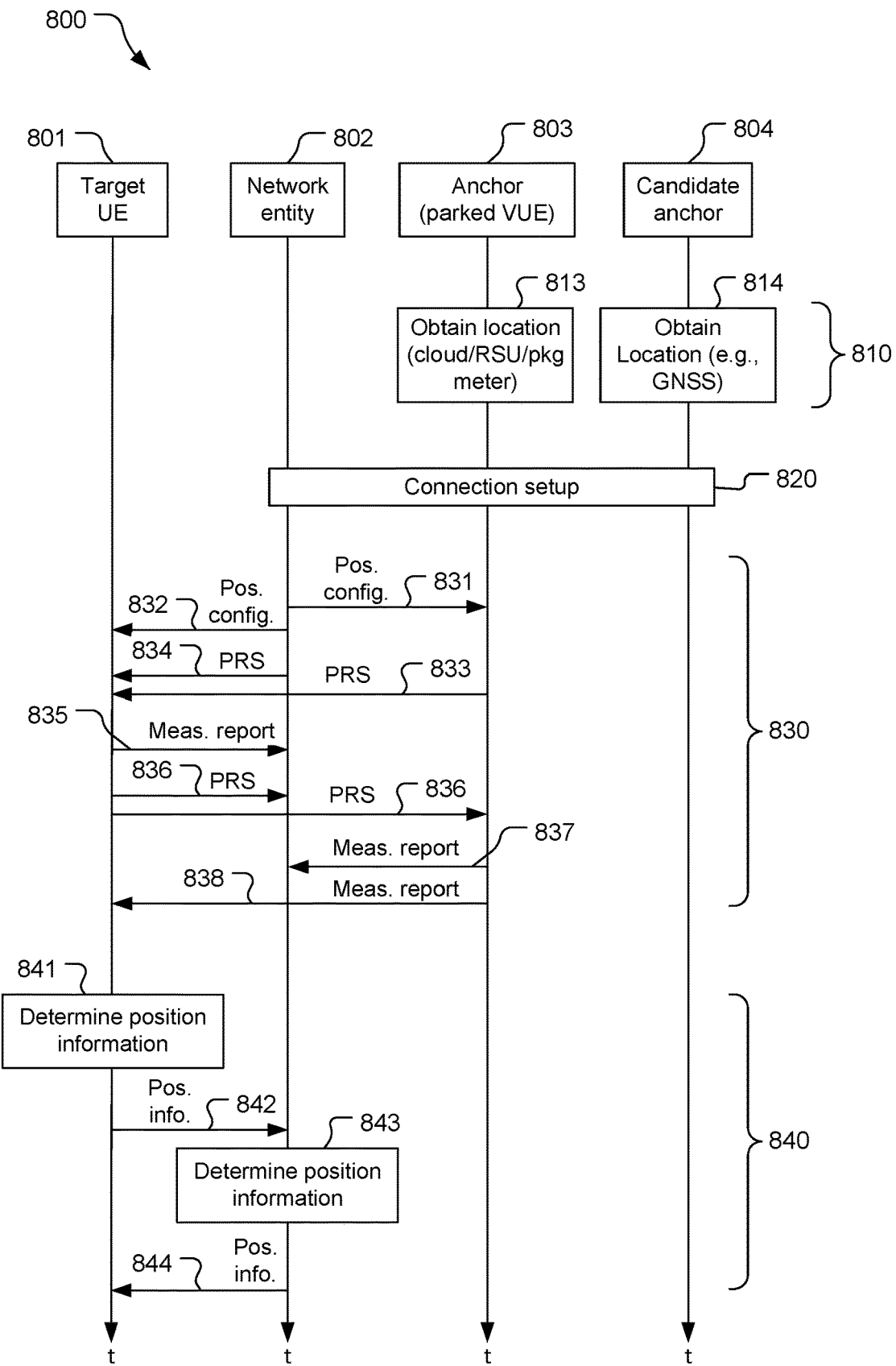
FIG. 8 is a signaling and process flow diagram for joint network entity/user equipment and user equipment/user equipment ranging.

Referring to FIG. 8, with further reference to FIGS. 1-7, a signaling and process flow 800 for joint NE/UE and UE/UE ranging between a target UE 801, a network entity 802, and an anchor 803 includes the stages shown. The flow 800 is an example and may be altered, e.g., by having one or more stages added and/or removed, having stages rearranged, combined, and/or performed concurrently, and/or having one or more single stages split into multiple stages.

At stage 810, the anchor 803 and a candidate anchor 804 obtain their respective locations. The anchor 803 at this time is a candidate anchor but labeled an anchor because the anchor 803 will later be selected as an anchor for ranging with the target UE 801. The anchor 803 and/or the candidate anchor 804 may obtain their respective locations at substages 813, 814 in one or more of a variety of ways. For example, as indicated in FIG. 8, the anchor 803 is a parked VUE and may obtain the location of the anchor 803 from interaction with an RSU (e.g., ranging with an RSU of known location) and/or a parking meter (e.g., receiving a location through near-field communication with the parking meter), and the candidate anchor 804 may obtain a location using a GNSS. Either or both of the anchor 803 and/or the candidate anchor 804 may, however, use one or more techniques other than indicated. The anchor 803 and the candidate anchor 804 may both use the same technique to determine location. A GNSS receiver (e.g., the SPS receiver 217) of the candidate anchor 804 may provide a location estimate of the candidate anchor 804 that is sufficiently accurate for the candidate anchor 804 to be used as an anchor UE (which may be called an anchor). As another example, the candidate anchor 804 (and/or the anchor 803) may use trilateration using one or more non-GNSS signals in addition to or instead of GNSS signals to determine location. As another example, the anchor 803 may use the location of an entity (e.g., an RSU, a parking meter, etc.) that is near the anchor 803 as the location of the candidate anchor UE. A candidate anchor may be more likely to be used as an anchor if the candidate anchor is stationary. For example, the anchor 803 may be the anchor 731 which is (as shown in FIG. 7) a VUE that is parked (and thus stationary) along a road 750. A parking meter 760 is disposed in close proximity to the anchor 731. The parking meter 760 may be configured to provide a location of the parking meter 760 to the anchor 731 to be used as the location of the anchor 731, and/or may be configured to determine in which of parking spaces 771, 772 the anchor 731 is disposed, and send an indication to the anchor 731 of a location (e.g., a center) of the parking space in which the anchor 731 is disposed, here the parking space 771.

The anchor 803 (e.g., the position information reporting unit 560 of the anchor 731), may be configured to determine a location of the anchor 803 in one or more of a variety of ways. For example, the anchor 731 may communicate with (e.g., using SL and/or near-field communication) the parking meter 760 to determine the location of the anchor 731 or a location (e.g., a location of the parking meter 760, or a location of the parking spot 771) assumed to be the location of the anchor 731. As another example, the anchor 731 may be configured to determine a location of the anchor 731 from an RSU and/or the cloud (e.g., by identifying a parking lot and a parking spot in the parking lot to an RSU and/or the cloud and the RSU and/or an entity in the cloud providing a location corresponding to that parking spot in that parking lot). The anchor 731 may provide the location of the anchor 731 directly to the network entity 720 or through the cloud, without communicating directly with the network entity 720. As another example, the anchor 731 may communicate with one or more network entities (e.g., the network entities 720, 721) to perform positioning to determine the location of the anchor 731, e.g., based on (and possibly in response to) the anchor 731 indicating that the anchor 731 is willing and capable of participating in joint ranging for a target UE. Still other techniques may be used to determine the location of the anchor 803 (e.g., the anchor 731).

At stage 820, a communication connection setup is performed to establish a communication connection between the network entity 802 and the anchor 803, and possibly a communication connection between the network entity 802 and the candidate anchor 804. The setup of a connection between the network entity 802 and the anchor 803 and possibly between the network entity 802 and the candidate anchor 804 may be performed in a variety of manners, e.g., as discussed below.

Figure 9:
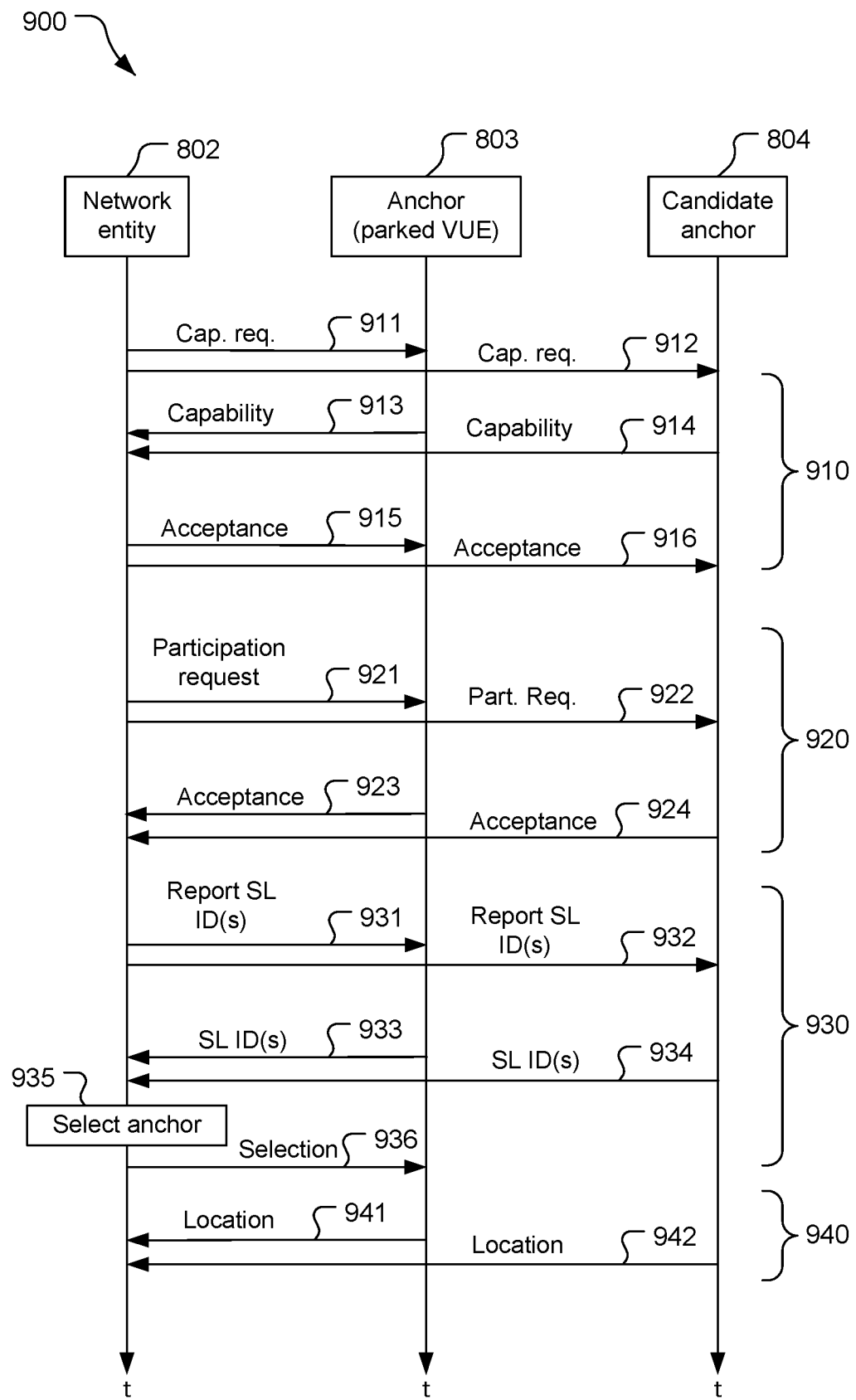
FIG. 9 is a signaling and process flow diagram for connection setup.

Referring also to FIG. 9, that shows a signaling and process flow 900 for connection setup, any of various options may be implemented to establish one or more of the communication connections. A connection may be established according to stage 910 or stage 920, or multiple connections established according to stage 930. According to the flow 900, the anchor 803 and/or the network entity 802 can determine that the anchor 803 is in an LOS state with respect to the target UE 801 and/or in close proximity to the target UE 801.

For example, at stage 910, the anchor 803 and the candidate anchor 804 send capability messages 913, 914, respectively, to the network entity 802 explicitly indicating the ability and willingness of the anchor 803 and the candidate anchor 804, respectively, to participate in joint NE/UE and UE/UE ranging (which may be called joint Uu and SL ranging). The capability messages 913, 914 may be sent in response to receiving capability request messages 911, 912 transmitted by the network entity 802 to the anchor 803 and to the candidate anchor 804, with the messages 911, 912 inquiring whether the anchor 803 and the candidate anchor 804, respectively, are capable of supporting joint NE/UE and UE/UE ranging. The network entity 802 may send acceptance messages 915, 916 to the anchor 803 and to the candidate anchor 804 indicating acceptance of the anchor 803 and the candidate anchor 804, respectively, to establish respective communication connections between the network entity 802 and the anchor 803 and the candidate anchor 804, The acceptance messages 915, 916 may indicate that the anchor 803 and the candidate anchor 804 will potentially be used as an anchor for ranging, e.g., with the target UE 801. At stage 910, the network entity 802 may send only the acceptance message 915 and not the acceptance message 916 (e.g., based on the candidate anchor 804 not having a modem turned ON and/or being outside a threshold distance from the target UE 801 based on approximate locations of the target UE 801 and the candidate anchor 804).

As another option, at stage 920, the network entity 802 (e.g., the anchor management unit 650) sends participation requests 921, 922 to the anchor 803 and the candidate anchor 804 (with the anchor 803 at this point also being a candidate anchor). The requests 921, 922 request the anchor 803 and the candidate anchor, respectively, to be an anchor in a joint NE/UE and UE/UE ranging session (and may indicate that the ranging session is with the target UE 801). The requests 921, 922 may include explicit inquiries (similar to the messages 911, 912) as to whether the anchor 803 and the candidate anchor 804 are capable of supporting joint NE/UE and UE/UE ranging, or may serve as implicit inquiries (in response to which the messages 913, 914 may be sent, possibly as part of acceptance messages 923, 924 discussed below). The network entity 802 may send the requests 921, 922 (and not send requests to other candidate anchors) based on one or more factors. For example, the network entity 802 may send the requests 921, 922 based on determinations that the anchor 803 and the candidate anchor 804 are stationary (e.g., parked) and have their respective modems switched ON (and not send a participation request to one or more candidate anchors based on the candidate anchor(s) not being stationary and/or not having its(their) modem turned ON). A parked VUE may have its modem turned ON for one or more of various reasons, e.g., to gather and provide information to the network entity 802 (e.g., images captured by a camera regarding a collision, and/or for collision avoidance, and/or for theft protection, etc.). The network entity 802 may send the request 921 and not the request 922 based on the candidate anchor 804 not being stationary and/or not having a modem turned ON. The anchor 803 and the candidate anchor 804 may respond by sending acceptance messages 923, 924 to the network entity 802 indicating that the anchor 803 and the candidate anchor 804, respectively, will participate in the joint ranging session, thus establishing communication connections with the network entity 802. The acceptance message 923 may serve as an indication of a capability of the anchor 803 to serve as an anchor for UE/UE ranging. The candidate anchor 804 may not send the acceptance message 924, e.g., based on the candidate anchor 804 not being stationary. As another example, the network entity 802 may send the requests 921, 922 based on determinations that the target UE 801 is within a threshold distance of requested ranging session participants, here the anchor 803 and the candidate anchor 804. For example, the network entity 802 may send the requests 921, 922 based on determining that an approximate location of the target UE 801 (e.g., based on E-CID, or serving cell center, etc.) is within a threshold distance of the anchor 803 and the candidate anchor 804 (and not send a participation request to one or more other candidate anchors that are further than the threshold distance from the target UE 801). These determinations may be based on approximate locations of the anchor 803 and the candidate anchor 804. The network entity 802 may not send the participation request 922 based on the candidate anchor 804 being further from the target UE 801 than the threshold distance. As another example, the network entity 802 may send the requests 921, 922, with the requests 921, 922 including an approximate location of the network entity 802 and the threshold distance, and the candidate anchor 804 may not send the acceptance message 924 based on the candidate anchor 804 determining that the candidate anchor 804 is further from the target UE 801 than the threshold distance.

As another option, at stage 930, the network entity 802 may determine whether one or more candidate anchors have a sufficient UE/UE communication link with the target UE 801 and select any such candidate anchor(s) to serve as anchor(s) for a joint NE/UE and UE/UE ranging session. The network entity 802 may transmit SL ID report messages 931, 932 to the anchor 803 and the candidate anchor 804, respectively, to request that the anchor 803 and the candidate anchor 804 report the sidelink identity (e.g., L1/L2 ID) of any UE that satisfies one or more conditions. The network entity 802 may transmit SL ID report messages only to stationary UEs (e.g., parked VUEs). The one or more conditions may, for example, be that a received signal power from the respective UE is greater than a threshold power (e.g., an SL RSRP is greater than a threshold RSRP, e.g., −70 dBm), and/or that there is LOS between the candidate anchor and a respective candidate target UE (e.g., based on an SL channel response). For example, pathloss being below a threshold and/or a number of paths of a signal from transmitter to receiver being below a threshold quantity are indications of LOS. The network entity 802 may indicate to the anchor 803 a confidence threshold (e.g., 80% sure of LOS) in order for the anchor 803 to report an SL ID corresponding to a received signal. The messages 931, 932 may request a candidate anchor to indicate the SL ID of any UE for which the one or more conditions is(are) satisfied, or may request a candidate anchor to indicate only whether the one or more conditions is(are) satisfied for one or more specific target UEs, e.g., to provide a response only if SL communication with the target UE 801 satisfies the one or more conditions. The anchor 803 and the candidate anchor 804 may provide SL ID(s) messages 933, 934 indicating the SL ID(s) of any UEs meeting the one or more conditions. Alternatively, the SL ID(s) messages 933, 934 may indicate the SL ID(s) of one or more UEs specified in the messages 931, 932 and that meet the one or more conditions. The messages 933, 934 may indicate the SL ID(s) of one or more UEs along with a respective binary indication of whether the one or more conditions is(are) met for the respective UE. Alternatively, if the messages 931, 932 indicated a single specific target UE, then the messages 933, 934 may provide a binary indication of whether the specific target UE meets the one or more conditions, or may be sent only if the one or more conditions is(are) met for the specified target UE. The message 933 may serve as an indication of a capability of the anchor 803 to serve as an anchor for UE/UE ranging, e.g., for any UE corresponding to the message 933 such as any UE whose ID is indicated in the message 933. At sub-state 935, the network entity 802 (e.g., the anchor management unit 650) may select one or more candidate anchors to be anchors for a joint NE/UE and UE/UE ranging session. For example, if the message 933 indicates that the target UE 801 satisfies the condition(s) and the message 934 indicates that another UE (and not the target UE 801) satisfies the condition(s), then the network entity 802 may select the anchor 803 as an anchor and not select the candidate anchor 804 as an anchor for a ranging session with the target UE 801. The network entity 802 may transmit a selection indication to any selected anchor to complete the communication connection with the anchor, e.g., a selection message 936 to the anchor 803 to complete a communication connection with the anchor 803.

At stage 940, with a communication connection established between the network entity 802 and the anchor 803, the anchor 803 transmits a location message 941 indicating a location (obtained at stage 810) of the anchor 803 to the network entity 802 (directly and/or indirectly such as through the cloud). If a communication connection was established between the network entity 802 and the candidate anchor 804, then the candidate anchor 804 may transmit a location message 942 indicating a location (obtained at stage 810) of the candidate anchor 804 to the network entity 802 (directly and/or indirectly).

At stage 830, the network entity 802 provides one or more PRS configurations to the anchor 803 and the candidate anchor 804. Based on successful connection setup at stage 820 between the network entity 802 and the anchor 803 (the selected anchor from one or more candidate anchors), the network entity 802 provides one or more PRS configurations to the target UE 801 and the anchor 803. For example, the network entity 802 may implement downlink positioning and/or uplink positioning.

If the network entity 802 is to perform downlink positioning for the target UE 801, then the network entity 802 (e.g., the ranging unit 660) transmits positioning configuration messages 831, 832 to the anchor 803 and the target UE 801, respectively, with DL PRS configuration information. The DL PRS configuration information includes, for example, a DL PRS sequence and a slot pattern for transmitting the DL PRS by the network entity 802 and by the anchor 803. The PRS configurations for the network entity 802 and the anchor 803 may be the same or different. The message 832 may include locations of the network entity 802 and the anchor 803 (or these locations may be provided in one or more messages separate from the message 832). The location of the anchor 803 may be provided by the anchor 803 to the target UE 801 in addition to or instead of being provided by the network entity 802 to the target UE 801. In the DL PRS case, the anchor 803 transmits DL PRS 833 and the network entity 802 transmits DL PRS 834 in accordance with the configuration information provided in the messages 831, 832. The target UE 801 may determine position information (e.g., ranges between the target UE 801 and the network entity 802, and between the target UE 801 and the anchor 803, and possibly the location of the target UE 801) as discussed below with respect to sub-stage 841. The target UE 801 (e.g., the PRS measurement unit 550) may measure the DL PRS 833, 834 and the target UE 801 (e.g., the position information reporting unit 560) may provide a measurement report 835 with position information (e.g., one or more PRS measurements, one or more ranges determined from the one or more PRS measurements) to the network entity 802 for use in determining position information (e.g., a location estimate for the target UE 801). Transmission and measurement of the DL PRS 833, 834 to determine one or more ranges provides joint UE/UE and NE/UE ranging. An SL PRS (and corresponding SL PRS configuration) may be used instead of the DL PRS 833.

If the network entity 802 is to perform uplink positioning for the target UE 801, then the positioning configuration messages 831, 832 include UL PRS configuration parameters. These parameters include one or more time instances (e.g., slots/frames) for PRS reception, and the PRS sequence that the target UE 801 should transmit and that the anchor 803 can expect to receive from the target UE 801. The target UE 801 transmits UL PRS 836 that can be received by the network entity 802 and the anchor 803. The target UE 801 may or may not be aware of whether the network entity 802 and/or the anchor 803 are the intended recipient(s) of the UL PRS 836. The network entity 802 and the anchor 803 (e.g., the PRS measurement unit 550) may measure the UL PRS 836 and the anchor 803 (e.g., the position information reporting unit 560) may transmit a measurement report 837 to the network entity 802 and/or a measurement report 838 to the target UE 801. The measurement report(s) 837, 838 may include position information (e.g., PRS measurement(s), range(s) based on the measurement(s), etc.). For example, the measurement reports 837, 838 may include received time/range determined from the UL PRS 836. The network entity 802 (e.g., the ranging unit 660) may use position information determined by the network entity 802 and/or received in the measurement report 837 to determine position information (e.g., a location estimate of the target UE 801) at sub-stage 843 discussed below. Transmission and measurement of the UL PRS 836 to determine one or more ranges provides joint UE/UE and NE/UE ranging. An SL PRS (and corresponding SL PRS configuration) may be used instead of the UL PRS 836.

At stage 840, position information may be determined by the target UE 801 and/or the network entity 802. For example, at sub-stage 841, the target UE 801 (e.g., the PRS measurement unit 550 and/or the position information reporting unit 560) may use one or more PRS measurements obtained at stage 830 (e.g., by measuring the PRS 833, 834 and/or as received from the measurement report 838 (or a measurement report from the network entity 802)) to determine position information, e.g., a range to the anchor 803, ranges to other anchors, and possibly a location estimate for the target UE 801. The position information reporting unit 560 may send a position information message 842 to the network entity 802, e.g., with one or more measurements if the network entity 802 is to determine a location estimate for the target UE 801, and/or with a location estimate for the target UE 801 if the target UE 801 determined the location estimate. At sub-stage 843, the ranging unit 660 of the network entity 802 (e.g., the server 400) may determine position information. For example, the ranging unit 660 may use information from one or more of the measurement reports 835, 837, and possibly other information (e.g., position information from the position information message 842) to determine position information for the target UE 801, e.g., to determine one or more ranges (e.g., pseudoranges), and/or one or more location estimates for the target UE 801. The network entity 802 may provide position information such as the location estimate(s) to one or more appropriate recipients, e.g., the target UE 801 in a position information message 844.

Figure 10:
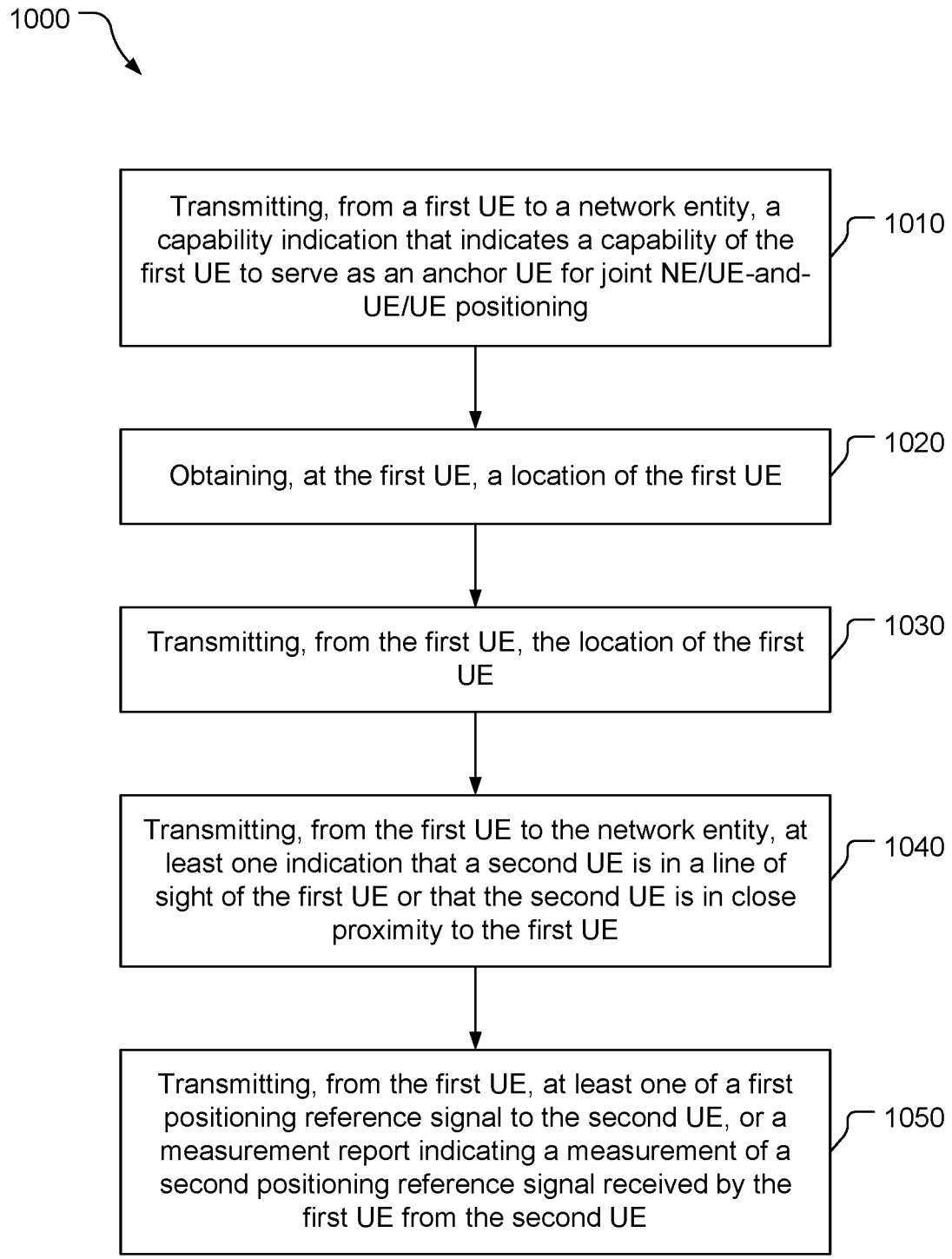
FIG. 10 is a block flow diagram of a method of assisting joint network entity/user equipment and user equipment/user equipment ranging.

Referring to FIG. 10, with further reference to FIGS. 1-9, a method 1000 of assisting joint NE/UE-and-UE/UE ranging includes the stages shown. The method 1000 is, however, an example only and not limiting. The method 1000 may be altered, e.g., by having one or more stages added and/or removed, having stages rearranged, combined, and/or performed concurrently, and/or having one or more single stages split into multiple stages.

At stage 1010, the method 1000 includes transmitting, from a first UE to a network entity, a capability indication that indicates a capability of the first UE to serve as an anchor UE for joint NE/UE-and-UE/UE ranging. For example, the anchor 803 (e.g., the processor 510) transmits (e.g., via the transceiver 520) the capability message 913, or the acceptance message 923, or the SL ID(s) message 933 to the network entity 802 indicating a capability of the anchor 803 to serve as an anchor for joint NE/UE-and-UE/UE ranging. The joint NE/UE-and-UE/UE ranging includes determining one or more ranges between the target UE 801 and one or more other entities (e.g., the network entity 802, the anchor 803, and/or one or more other anchors, etc.) and may include positioning of the target UE 801 (e.g., determining a location estimate for the target UE 801). The processor 510, possibly in combination with the memory 530, in combination with the transceiver 520 (e.g., the wireless transmitter 242 and the antenna 246) may comprise means for transmitting the capability indication.

At stage 1020, the method 1000 includes obtaining, at the first UE, a location of the first UE. For example, the anchor 803 may obtain the location of the anchor 803 at stage 810 as discussed above, e.g., at sub-stage 813 from interaction with the cloud, an RSU, one or more base stations, and/or one or more other devices, and/or from a GNSS receiver (e.g., combining a location determined by the SPS receiver 217 with a location determined by other means). The anchor 803 may interact with one or more other entities using cellular technology, near-field communications, a short-range wireless protocol (e.g., Bluetooth®), etc. The anchor 803 may use trilateration to determine the location of the anchor 803 and/or may be provided with a location (e.g., of a nearby entity) of the anchor 803 or to be used as the location of the anchor 803 (e.g., the location of the parking meter 760). For example, the anchor 731, being a parked VUE, may determine a location of the anchor 731 using near-field communication with the parking meter 760. The processor 510, possibly in combination with the memory 530, possibly in combination with the transceiver 520 (e.g., the wireless receiver 244 and the antenna 246, and possibly the wireless transmitter 242) may comprise means for obtaining the location of the first UE.

At stage 1030, the method 1000 includes transmitting, from the first UE, the location of the first UE. For example, the anchor 803 transmits the location message 941 to the network entity 802. Also or alternatively, the anchor 803 may transmit an indication of the location of the anchor 803 to the target UE 801 (directly if a communication connection exists between the anchor 803 and the target UE 801, or indirectly via the network entity 802). The processor 510, possibly in combination with the memory 530, in combination with the transceiver 520 (e.g., the wireless transmitter 242 and the antenna 246) may comprise means for transmitting the location of the first UE.

At stage 1040, the method 1000 includes transmitting, from the first UE to the network entity, at least one indication that a second UE is in a line of sight of the first UE or that the second UE is in close proximity to the first UE. For example, at stage 930 the anchor 803 (e.g., the processor 510) may use channel response between one or more other UEs and/or received power from the one or more UEs to determine which, if any, of the UEs are likely LOS with the anchor 803 and/or in close proximity to (e.g., within a threshold distance of) the anchor 803. The anchor 803 may, for example, receive signals from the one or more other UEs and determine whether received signal power(s) meets (meet) one or more criteria (e.g., received power above a threshold power). The processor 510 may transmit the at least one indication of LOS or close proximity via the transceiver 520. The at least one indication (e.g., in the SL ID(s) message 933) may include an ID (e.g., and SL ID) of another UE that is LOS and/or in close proximity to the anchor 803, and/or may include an explicit indication that the other UE is close to and/or LOS with the anchor 803. As another example, the at least one indication may implicitly indicate the other UE. For example, the indication may be an acceptance (e.g., at least part of the acceptance message 923) of a request to be an anchor for a joint NE/UE-and-UE/UE ranging session where the request (e.g., the participation request 921) identifies the target UE 801 and the acceptance includes an indication that the acceptance corresponds to the request (e.g., includes a request ID). The processor 510, possibly in combination with the memory 530, in combination with the transceiver 520 (e.g., the wireless transmitter 242 and the antenna 246) may comprise means for transmitting the at least one indication.

At stage 1050, transmitting, from the first UE, at least one of a first positioning reference signal to the second UE, or a measurement report indicating a measurement of a second positioning reference signal received by the first UE from the second UE. For example, the processor 510 of the anchor 803 may transmit the PRS 833 via the transceiver 520 to the target UE 801 and/or may transmit the measurement report 837 and/or the measurement report 838 to the network entity 802 and/or the target UE 801, respectively, with the measurement report(s) 837, 838 indicating one or more measurements of the PRS 836 received from the target UE 801. The processor 510, possibly in combination with the memory 530, in combination with the transceiver 520 (e.g., the wireless transmitter 242 and the antenna 246) may comprise means for transmitting at least one of the first PRS to the second UE or the measurement report.

Implementations of the method 1000 may include one or more of the following features. In an example implementation, the capability indication is transmitted in response to the first UE receiving a message from the network entity at least one of inquiring as to whether the first UE is capable of serving as an anchor UE for joint NE/UE-and-UE/UE ranging or requesting the first UE to serve as an anchor UE for joint NE/UE-and-UE/UE ranging. For example, the anchor 803 (e.g., the processor 510 and the transceiver 520) may transmit the capability message 913 in response to receiving the capability request message 911 and/or as part of the acceptance message 923 in response to the participation request 921. In another example implementation, the method 1000 includes receiving a configuration of the first positioning reference signal at the first UE from the network entity in response to transmitting the at least one indication that the second UE is in line of sight of the first UE or that the second UE is in close proximity to the first UE, wherein the first positioning reference signal is transmitted in accordance with the configuration of the first positioning reference signal. For example, the anchor 803 receives the configuration of the PRS 833 in the positioning configuration message 831 from the network entity 802 in response to the indication provided at stage 820 of the anchor 803 being LOS with and/or in close proximity to the target UE 801. The processor 510, possibly in combination with the memory 530, in combination with the transceiver 520 (e.g., the wireless receiver 244 and the antenna 246) may comprise means for receiving the PRS configuration. In a further example implementation, the first positioning reference signal is either a downlink positioning reference signal or a sidelink positioning reference signal.

Also or alternatively, implementations of the method 1000 may include one or more of the following features. In an example implementation, the method 1000 includes: receiving a configuration of the second positioning reference signal at the first UE from the network entity in response to transmitting the at least one indication that the second UE is in line of sight of the first UE or that the second UE is in close proximity to the first UE; and obtaining the measurement of the second positioning reference signal by measuring the second positioning reference signal using the configuration of the second positioning reference signal. For example, the anchor 803 receives the configuration of the PRS 836 in the positioning configuration message 831 from the network entity 802 in response to the indication provided at stage 820 of the anchor 803 being LOS with and/or in close proximity to the target UE 801, and measures the PRS 836 in accordance with the received configuration of the PRS 836. The processor 510, possibly in combination with the memory 530, in combination with the transceiver 520 (e.g., the wireless receiver 244 and the antenna 246) may comprise means for receiving the PRS configuration. The processor 510, possibly in combination with the memory 530, possibly in combination with the transceiver 520 (e.g., the wireless receiver 244 and the antenna 246) may comprise means for obtaining the measurement of the second PRS. In a further example implementation, the second positioning reference signal is either an uplink positioning reference signal or a sidelink positioning reference signal.

Implementation Examples

Implementation examples are provided in the following numbered clauses.

Clause 1. A first user equipment (UE) comprising:
a transceiver;
a memory;
one or more processors communicatively coupled to the transceiver and the memory and configured to:
transmit, to a network entity (NE) via the transceiver, a capability indication that indicates a capability of the first UE to serve as an anchor UE for joint NE/UE-and-UE/UE ranging;
obtain a location of the first UE;
transmit, via the transceiver, the location of the first UE; and
transmit, via the transceiver to the network entity, at least one indication that a second UE is in a line of sight of the first UE or that the second UE is in close proximity to the first UE; and
transmit, via the transceiver, at least one of a first positioning reference signal to the second UE, or a measurement report indicating a measurement of a second positioning reference signal received by the first UE from the second UE.

Clause 2. The first UE of clause 1, wherein the one or more processors are configured to transmit, via the transceiver to the network entity, the capability indication in response to receiving a message from the network entity at least one of inquiring as to whether the first UE is capable of serving as an anchor UE for joint NE/UE-and-UE/UE ranging or requesting the first UE to serve as an anchor UE for joint NE/UE-and-UE/UE ranging.

Clause 3. The first UE of clause 1, wherein the one or more processors are further configured to receive a configuration of the first positioning reference signal via the transceiver from the network entity in response to transmitting the at least one indication that the second UE is in line of sight of the first UE or that the second UE is in close proximity to the first UE, wherein the one or more processors are configured to transmit the first positioning reference signal in accordance with the configuration of the first positioning reference signal.

Clause 4. The first UE of clause 3, wherein the first positioning reference signal is either a downlink positioning reference signal or a sidelink positioning reference signal.

Clause 5. The first UE of clause 1, wherein the one or more processors are further configured to:
receive a configuration of the second positioning reference signal via the transceiver from the network entity in response to transmitting the at least one indication that the second UE is in line of sight of the first UE or that the second UE is in close proximity to the first UE; and
obtain the measurement of the second positioning reference signal using the configuration of the second positioning reference signal.

Clause 6. The first UE of clause 5, wherein the second positioning reference signal is either an uplink positioning reference signal or a sidelink reference signal.

Clause 7. A method of assisting joint network entity/user equipment and user equipment/user equipment (NE/UE-and-UE/UE) ranging, the method comprising:

transmitting, from a first UE to a network entity, a capability indication that indicates a capability of the first UE to serve as an anchor UE for joint NE/UE-and-UE/UE ranging;
obtaining, at the first UE, a location of the first UE;
transmitting, from the first UE, the location of the first UE;
transmitting, from the first UE to the network entity, at least one indication that a second UE is in a line of sight of the first UE or that the second UE is in close proximity to the first UE; and
transmitting, from the first UE, at least one of a first positioning reference signal to the second UE, or a measurement report indicating a measurement of a second positioning reference signal received by the first UE from the second UE.

Clause 8. The method of assisting joint NE/UE-and-UE/UE ranging of clause 7, wherein the capability indication is transmitted in response to the first UE receiving a message from the network entity at least one of inquiring as to whether the first UE is capable of serving as an anchor UE for joint NE/UE-and-UE/UE ranging or requesting the first UE to serve as an anchor UE for joint NE/UE-and-UE/UE ranging.

Clause 9. The method of assisting joint NE/UE-and-UE/UE ranging of clause 7, further comprising receiving a configuration of the first positioning reference signal at the first UE from the network entity in response to transmitting the at least one indication that the second UE is in line of sight of the first UE or that the second UE is in close proximity to the first UE, wherein the first positioning reference signal is transmitted in accordance with the configuration of the first positioning reference signal.

Clause 10. The method of assisting joint NE/UE-and-UE/UE ranging of clause 9, wherein the first positioning reference signal is either a downlink positioning reference signal or a sidelink positioning reference signal.

Clause 11. The method of assisting joint NE/UE-and-UE/UE ranging of clause 7, further comprising:
receiving a configuration of the second positioning reference signal at the first UE from the network entity in response to transmitting the at least one indication that the second UE is in line of sight of the first UE or that the second UE is in close proximity to the first UE; and
obtaining the measurement of the second positioning reference signal by measuring the second positioning reference signal using the configuration of the second positioning reference signal.

Clause 12. The method of assisting joint NE/UE-and-UE/UE ranging of clause 11, wherein the second positioning reference signal is either an uplink positioning reference signal or a sidelink positioning reference signal.

Clause 13. A first user equipment (UE) comprising:
means for transmitting, to a network entity (NE), a capability indication that indicates a capability of the first UE to serve as an anchor UE for joint NE/UE-and-UE/UE ranging;
means for obtaining a location of the first UE;
means for transmitting the location of the first UE;
means for transmitting at least one indication that a second UE is in a line of sight of the first UE or that the second UE is in close proximity to the first UE; and
means for transmitting at least one of a first positioning reference signal to the second UE, or a measurement report indicating a measurement of a second positioning reference signal received by the first UE from the second UE.

Clause 14. The first UE of clause 13, wherein the means for transmitting the capability indication comprise means for transmitting the capability indication in response to the first UE receiving a message from the network entity at least one of inquiring as to whether the first UE is capable of serving as an anchor UE for joint NE/UE-and-UE/UE ranging or requesting the first UE to serve as an anchor UE for joint NE/UE-and-UE/UE ranging.

Clause 15. The first UE of clause 13, further comprising means for receiving a configuration of the first positioning reference signal at the first UE from the network entity in response to transmitting the at least one indication that the second UE is in line of sight of the first UE or that the second UE is in close proximity to the first UE, wherein the means for transmitting the first positioning reference signal comprise means for transmitting the first positioning reference signal in accordance with the configuration of the first positioning reference signal.

Clause 16. The first UE of clause 15, wherein the first positioning reference signal is either a downlink positioning reference signal or a sidelink positioning reference signal.

Clause 17. The first UE of clause 13, further comprising:
means for receiving a configuration of the second positioning reference signal at the first UE from the network entity in response to transmitting the at least one indication that the second UE is in line of sight of the first UE or that the second UE is in close proximity to the first UE; and
means for obtaining the measurement of the second positioning reference signal by measuring the second positioning reference signal using the configuration of the second positioning reference signal.

Clause 18. The first UE of clause 17, wherein the second positioning reference signal is either an uplink positioning reference signal or a sidelink positioning reference signal.

Clause 19. A non-transitory, processor-readable storage medium comprising processor-readable instructions to cause one or more processors of a first user equipment (UE) to:
transmit, to a network entity (NE), a capability indication that indicates a capability of the first UE to serve as an anchor UE for joint NE/UE-and-UE/UE ranging;
obtain a location of the first UE;
transmit the location of the first UE;
transmit at least one indication that a second UE is in a line of sight of the first UE or that the second UE is in close proximity to the first UE; and
transmit at least one of a first positioning reference signal to the second UE, or a measurement report indicating a measurement of a second positioning reference signal received by the first UE from the second UE.

Clause 20. The non-transitory, processor-readable storage medium of clause 19, wherein the instructions to cause the one or more processors to transmit the capability indication comprise instructions to cause the one or more processors to transmit the capability indication in response to the first UE receiving a message from the network entity at least one of inquiring as to whether the first UE is capable of serving as an anchor UE for joint NE/UE-and-UE/UE ranging or requesting the first UE to serve as an anchor UE for joint NE/UE-and-UE/UE ranging.

Clause 21. The non-transitory, processor-readable storage medium of clause 19, further comprising instructions to cause the one or more processors to receive a configuration of the first positioning reference signal at the first UE from the network entity in response to transmitting the at least one indication that the second UE is in line of sight of the first UE or that the second UE is in close proximity to the first UE, wherein the instructions to cause the one or more processors to transmit the first positioning reference signal comprise instructions to cause the one or more processors to transmit the first positioning reference signal in accordance with the configuration of the first positioning reference signal.

Clause 22. The non-transitory, processor-readable storage medium of clause 21, wherein the first positioning reference signal is either a downlink positioning reference signal or a sidelink positioning reference signal.

Clause 23. The non-transitory, processor-readable storage medium of clause 19, further comprising instructions to cause the one or more processors to:
receive a configuration of the second positioning reference signal at the first UE from the network entity in response to transmitting the at least one indication that the second UE is in line of sight of the first UE or that the second UE is in close proximity to the first UE; and
obtain the measurement of the second positioning reference signal by measuring the second positioning reference signal using the configuration of the second positioning reference signal.

Clause 24. The non-transitory, processor-readable storage medium of clause 23, wherein the second positioning reference signal is either an uplink positioning reference signal or a sidelink positioning reference signal.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that communication using the wireless communication device is exclusively, or evenly primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of 20% or ±10%, ±5%, or +0.10% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A first user equipment (UE) comprising:
a transceiver;
a memory;
one or more processors communicatively coupled to the transceiver and the memory and configured to:
transmit, to a network entity (NE) via the transceiver, a capability indication that indicates a capability of the first UE to serve as an anchor UE for joint NE/UE-and-UE/UE ranging, the capability indication indicating that the first UE is stationary;

obtain a location of the first UE;
transmit, via the transceiver, the location of the first UE; and
transmit, via the transceiver to the network entity, at least one indication that a second UE is in a line of sight of the first UE or that the second UE is in close proximity to the first UE; and
transmit, via the transceiver, at least one of a first positioning reference signal to the second UE, or a measurement report indicating a measurement of a second positioning reference signal received by the first UE from the second UE.

2. The first UE of claim 1, wherein the one or more processors are configured to transmit, via the transceiver to the network entity, the capability indication in response to receiving a message from the network entity at least one of inquiring as to whether the first UE is capable of serving as an anchor UE for joint NE/UE-and-UE/UE ranging or requesting the first UE to serve as an anchor UE for joint NE/UE-and-UE/UE ranging.

3. The first UE of claim 1, wherein the one or more processors are further configured to receive a configuration of the first positioning reference signal via the transceiver from the network entity in response to transmitting the at least one indication that the second UE is in line of sight of the first UE or that the second UE is in close proximity to the first UE, wherein the one or more processors are configured to transmit the first positioning reference signal in accordance with the configuration of the first positioning reference signal.

4. The first UE of claim 3, wherein the first positioning reference signal is either a downlink positioning reference signal or a sidelink positioning reference signal.

5. The first UE of claim 1, wherein the one or more processors are further configured to:
receive a configuration of the second positioning reference signal via the transceiver from the network entity in response to transmitting the at least one indication that the second UE is in line of sight of the first UE or that the second UE is in close proximity to the first UE; and
obtain the measurement of the second positioning reference signal using the configuration of the second positioning reference signal.

6. The first UE of claim 5, wherein the second positioning reference signal is either an uplink positioning reference signal or a sidelink reference signal.

7. The first UE of claim 1, wherein the one or more processors are configured to transmit the capability indication as part of an acceptance message accepting a request to be an anchor in a joint NE/UE-and-UE/UE ranging session.

8. A method of assisting joint network entity/user equipment and user equipment/user equipment (NE/UE-and-UE/UE) ranging, the method comprising:
transmitting, from a first UE to a network entity, a capability indication that indicates a capability of the first UE to serve as an anchor UE for joint NE/UE-and-UE/UE ranging, the capability indication indicating that the first UE is stationary;
obtaining, at the first UE, a location of the first UE;
transmitting, from the first UE, the location of the first UE;
transmitting, from the first UE to the network entity, at least one indication that a second UE is in a line of sight of the first UE or that the second UE is in close proximity to the first UE; and
transmitting, from the first UE, at least one of a first positioning reference signal to the second UE, or a measurement report indicating a measurement of a second positioning reference signal received by the first UE from the second UE.

9. The method of assisting joint NE/UE-and-UE/UE ranging of claim 8, wherein the capability indication is transmitted in response to the first UE receiving a message from the network entity at least one of inquiring as to whether the first UE is capable of serving as an anchor UE for joint NE/UE-and-UE/UE ranging or requesting the first UE to serve as an anchor UE for joint NE/UE-and-UE/UE ranging.

10. The method of assisting joint NE/UE-and-UE/UE ranging of claim 8, further comprising receiving a configuration of the first positioning reference signal at the first UE from the network entity in response to transmitting the at least one indication that the second UE is in line of sight of the first UE or that the second UE is in close proximity to the first UE, wherein the first positioning reference signal is transmitted in accordance with the configuration of the first positioning reference signal.

11. The method of assisting joint NE/UE-and-UE/UE ranging of claim 10, wherein the first positioning reference signal is either a downlink positioning reference signal or a sidelink positioning reference signal.

12. The method of assisting joint NE/UE-and-UE/UE ranging of claim 8, further comprising:
receiving a configuration of the second positioning reference signal at the first UE from the network entity in response to transmitting the at least one indication that the second UE is in line of sight of the first UE or that the second UE is in close proximity to the first UE; and
obtaining the measurement of the second positioning reference signal by measuring the second positioning reference signal using the configuration of the second positioning reference signal.

13. The method of assisting joint NE/UE-and-UE/UE ranging of claim 12, wherein the second positioning reference signal is either an uplink positioning reference signal or a sidelink positioning reference signal.

14. A first user equipment (UE) comprising:
means for transmitting, to a network entity (NE), a capability indication that indicates a capability of the first UE to serve as an anchor UE for joint NE/UE-and-UE/UE ranging, the capability indication indicating that the first UE is stationary;
means for obtaining a location of the first UE;
means for transmitting the location of the first UE;
means for transmitting at least one indication that a second UE is in a line of sight of the first UE or that the second UE is in close proximity to the first UE; and
means for transmitting at least one of a first positioning reference signal to the second UE, or a measurement report indicating a measurement of a second positioning reference signal received by the first UE from the second UE.

15. The first UE of claim 14, wherein the means for transmitting the capability indication comprise means for transmitting the capability indication in response to the first UE receiving a message from the network entity at least one of inquiring as to whether the first UE is capable of serving as an anchor UE for joint NE/UE-and-UE/UE ranging or requesting the first UE to serve as an anchor UE for joint NE/UE-and-UE/UE ranging.

16. The first UE of claim 14, further comprising means for receiving a configuration of the first positioning reference signal at the first UE from the network entity in response to transmitting the at least one indication that the second UE is in line of sight of the first UE or that the second UE is in close proximity to the first UE, wherein the means for transmitting the first positioning reference signal comprise means for transmitting the first positioning reference signal in accordance with the configuration of the first positioning reference signal.

17. The first UE of claim 16, wherein the first positioning reference signal is either a downlink positioning reference signal or a sidelink positioning reference signal.

18. The first UE of claim 14, further comprising:
means for receiving a configuration of the second positioning reference signal at the first UE from the network entity in response to transmitting the at least one indication that the second UE is in line of sight of the first UE or that the second UE is in close proximity to the first UE; and
means for obtaining the measurement of the second positioning reference signal by measuring the second positioning reference signal using the configuration of the second positioning reference signal.

19. The first UE of claim 18, wherein the second positioning reference signal is either an uplink positioning reference signal or a sidelink positioning reference signal.

20. A non-transitory, processor-readable storage medium comprising processor-readable instructions to cause one or more processors of a first user equipment (UE) to:
transmit, to a network entity (NE), a capability indication that indicates a capability of the first UE to serve as an anchor UE for joint NE/UE-and-UE/UE ranging, the capability indication indicating that the first UE is stationary;
obtain a location of the first UE;
transmit the location of the first UE;
transmit at least one indication that a second UE is in a line of sight of the first UE or that the second UE is in close proximity to the first UE; and
transmit at least one of a first positioning reference signal to the second UE, or a measurement report indicating a measurement of a second positioning reference signal received by the first UE from the second UE.

21. The non-transitory, processor-readable storage medium of claim 20, wherein the instructions to cause the one or more processors to transmit the capability indication comprise instructions to cause the one or more processors to transmit the capability indication in response to the first UE receiving a message from the network entity at least one of inquiring as to whether the first UE is capable of serving as an anchor UE for joint NE/UE-and-UE/UE ranging or requesting the first UE to serve as an anchor UE for joint NE/UE-and-UE/UE ranging.

22. The non-transitory, processor-readable storage medium of claim 20, further comprising instructions to cause the one or more processors to receive a configuration of the first positioning reference signal at the first UE from the network entity in response to transmitting the at least one indication that the second UE is in line of sight of the first UE or that the second UE is in close proximity to the first UE, wherein the instructions to cause the one or more processors to transmit the first positioning reference signal comprise instructions to cause the one or more processors to transmit the first positioning reference signal in accordance with the configuration of the first positioning reference signal.

23. The non-transitory, processor-readable storage medium of claim 22, wherein the first positioning reference signal is either a downlink positioning reference signal or a sidelink positioning reference signal.

24. The non-transitory, processor-readable storage medium of claim 20, further comprising instructions to cause the one or more processors to:
receive a configuration of the second positioning reference signal at the first UE from the network entity in response to transmitting the at least one indication that the second UE is in line of sight of the first UE or that the second UE is in close proximity to the first UE; and
obtain the measurement of the second positioning reference signal by measuring the second positioning reference signal using the configuration of the second positioning reference signal.

25. The non-transitory, processor-readable storage medium of claim 24, wherein the second positioning reference signal is either an uplink positioning reference signal or a sidelink positioning reference signal.

\* \* \* \* \*